United States Patent [19]

Howard et al.

[11] Patent Number: 5,312,639

[45] Date of Patent: * May 17, 1994

[54] SHELF-STABLE RICE PRODUCTS AND PROCESSES FOR THEIR PRODUCTION

[75] Inventors: John G. Howard; John Atherton; Eric S. Field; Michael J. Hawkins, all of King's Lynn, United Kingdom

[73] Assignee: Mars Incorporated, McLean, Va.

[*] Notice: The portion of the term of this patent subsequent to May 3, 2011 has been disclaimed.

[21] Appl. No.: 678,984

[22] PCT Filed: Aug. 31, 1990

[86] PCT No.: PCT/GB90/01348

§ 371 Date: Jun. 5, 1991

§ 102(e) Date: Jun. 5, 1991

[87] PCT Pub. No.: WO91/03171

PCT Pub. Date: Mar. 21, 1991

[30] Foreign Application Priority Data

Sep. 1, 1989 [GB] United Kingdom ............ 8919820.4

[51] Int. Cl.$^5$ ................................................ A23B 9/16
[52] U.S. Cl. .................................. 426/575; 426/459; 426/460; 426/412
[58] Field of Search ............... 426/573, 575, 577, 459, 426/460, 412

[56] References Cited

U.S. PATENT DOCUMENTS

| | | | |
|---|---|---|---|
| 4,085,234 | 4/1978 | Kamada | 426/625 |
| 4,101,683 | 7/1978 | Kamada | 426/625 |
| 4,276,311 | 6/1981 | Burrows et al. | 426/56 |
| 4,435,435 | 3/1984 | Hsu | 426/557 |
| 4,504,504 | 3/1985 | Gaehring et al. | 426/321 |
| 4,517,215 | 5/1985 | Hsu | 426/557 |
| 4,544,563 | 10/1985 | Lechthaler | 426/557 |
| 4,552,772 | 11/1985 | Saitoh et al. | 426/557 |
| 4,597,976 | 7/1986 | Doster et al. | 426/325 |
| 4,599,238 | 7/1986 | Saitoh et al. | 426/557 |
| 4,659,576 | 4/1987 | Dahle et al. | 426/324 |
| 4,734,291 | 3/1988 | Raffensperger | 426/325 |
| 4,741,911 | 5/1988 | McIntyre | 426/412 |
| 4,828,852 | 5/1989 | Hus et al. | 426/94 |
| 4,844,936 | 7/1989 | Cox | 426/524 |
| 4,888,193 | 12/1989 | Konno et al. | 426/549 |

FOREIGN PATENT DOCUMENTS 0322996 7/1989 European Pat. Off. .
2130906 10/1972 France .
57-5680 1/1982 Japan .
1118730 7/1968 United Kingdom .

OTHER PUBLICATIONS

Patent Abstracts of Japan, vol. 12, No. 209, Jun. 15, 1988; for JP-A-770 (Nippon Kayaku Co., Ltd) Jun. 27, 1986.
Patent Abstracts of Japan, vol. 6, No. 63, Apr. 22, 1982; for JP-A-57 005 680 (Kibun K.K.) Jan. 12, 1982.
Patent Abstracts of Japan, vol. 12, No. 472, Dec. 9, 1988, for JP-A-192 353 (Otsuka Shokuhin Kogyo K.K.) Sep. 9, 1988.

Primary Examiner—Carolyn Paden
Attorney, Agent, or Firm—Curtis, Morris & Safford

[57] ABSTRACT

A process for preparing a preserved rice product is disclosed. Here rice is treated at a pH of 4.5 or below with a polymeric acid food acceptable acid and placed in a microorganism-impermeable container.

13 Claims, No Drawings

SHELF-STABLE RICE PRODUCTS AND PROCESSES FOR THEIR PRODUCTION

BACKGROUND OF THE INVENTION

The present invention relates to acid-pasteurised, shelf-stable, rice products and to processes for their production.

By shelf-stable is meant that the product can be stored at room temperature for long periods of time without being subject to spoilage by microbial action, without its organoleptic properties deteriorating an without it acquiring any undesirable flavour. Typically, food products are considered to be shelf-stable if they meet these requirements after at least nine months and preferably after at least twelve or fourteen months of storage at room temperature. The major reason that many food products are not shelf-stable is that the growth of spoilage microorganisms is not inhibited. Therefore, an essential requirement of a shelf-stable food product is that it should not be susceptible to the growth, of spoilage microorganisms.

FIELD OF THE INVENTION

At present, rice is available to the public as raw rice, parboiled rice, frozen rice or canned rice. Both raw and parboiled rice have the advantage that they are generally shelf-stable. Raw and parboiled rice are shelf-stable because they have a low water content, generally in the region of about 12% by weight. This is too low to support microbial growth.

Raw rice is generally available as "white" rice, that is the kernel of the rice from which the bran layer and the husk have been removed. Raw rice is also available as "brown" rice, which is the same as "white" rice except its bran layer has been retained. Raw white rice is cooked by boiling it for about fifteen minutes in salted water. Cooking raw brown rice generally takes somewhat longer.

Raw rice is generally acceptable if it is cooked properly. However, it is very easy to over- or under-cook the rice so that an unacceptable product is produced. Moreover, cooked raw rice tends to be very sticky and this has an unacceptable appearance and mouthfeel. Further, raw rice, especially "white" raw rice, has little nutritive value, as most of the nutrients are present in the husk or the bran layer.

Parboiled rice was developed in order to overcome some of the disadvantages of raw rice. The most common method of producing parboiled rice is to soak paddy rice (i.e. rice having the husk and bran layer still present) and then to heat it, for instance by steaming. This causes gelatinisation of the starch in the kernel and also induces many of the nutrients in the husk and bran layer to diffuse into the kernel. A recent development in the production of par-boiled rice is disclosed in EP-A-0 352 939. In the process disclosed in this document, the rice is parboiled by the use of dry heat at a much lower moisture content than is possible using conventional parboiling processes.

Parboiled rice has the advantages that: it is more nutritious than raw rice; on cooking, it does not become sticky; and it is much less susceptible to overcooking than raw rice. It is thus more acceptable both nutritionally and organoleptically and is easier to prepare in acceptable form. However, parboiled rice has the disadvantage that it takes at least twenty minutes, or even longer for brown parboiled rice, to cook. Thus, it cannot readily be used as a convenience food.

In order to overcome the problem of the long cooking times of raw and parboiled rice, frozen rice has been placed on the market. Frozen rice generally comprises raw or, more often, parboiled rice which has been cooked, drained and frozen. As long as it is kept frozen, it is stable for long periods. However, if as it is allowed to warm to room temperature, it will soon spoil. Frozen rice is prepared for eating merely by heating it to the required temperature, for instance in a microwave oven.

Frozen rice has the disadvantage that it requires freezing facilities at the point of production, at the point of sale and at the point of use. It also requires refrigerated transportation. This is very energy-intensive and thus makes the product relatively expensive.

There have been many proposals for the production of shelf-stable rice which can be used as a convenience food. One such proposal, which resulted in the production of a dry rice product, required the pre-cooking and then drying of the product under relatively harsh conditions. The product was shelf-stable in that it had a low water content. It could be prepared for eating by soaking in boiling water for a short time. However, it only had limited consumer acceptability because it tended to become sticky and did not have the mouthfeel associated with properly cooked raw or parboiled rice.

Another shelf-stable rice which can be used as a convenience food is canned rice. In producing canned rice, raw or, more often, parboiled rice is cooked, drained, and filled into cans. The cans are then sealed, generally under vacuum or inert gas atmosphere, and sterilized by heating to a temperature of about 122° C. for about 38 minutes.

Canned rice can be prepared for eating merely be opening the can and reheating the rice, for instance in a microwave oven. Canned rice when cooked is acceptable to the consumer and has most of the properties of well cooked raw or parboiled rice. However, its texture is not as good since some of the grain structure is destroyed during the sterilization stage, giving a rubbery texture. Moreover, the rice has a browner colour than freshly cooked rice.

Canned rice has a number of other disadvantages. Many consumers associate canned foods with inferior products. For instance, most consumers prefer frozen vegetables to canned vegetables. Canned rice is also relatively expensive. This is because rice is quite corrosive towards metals and therefore high quality cans need to be used to ensure that the cans are not corroded. Moreover, the production process is relatively expensive in that it requires careful control of the canning process and a heat sterilization step.

There have also been many proposals for the production of acid-pasteurized rice, although to the Applicant's knowledge none of these proposals has resulted in the production of a commercially available product.

Acid-pasteurisation is a well known process which has been used in connection with a variety of products for some long time. Acid-pasteurisation was developed in order to enable a product to be sterilized at a much lower temperature than is possible if heat sterilization is to be carried out at neutral pH. It is generally recognised that if the pH of a product is reduced to 4.5 or below, it is possible to sterilize a product without needing to heat it above the boiling point of water. This is advantageous because it means that heating can be carried out by steaming at atmospheric pressure or soaking in hot water. Thus, there is no requirement for pressurized systems to accomplish the heating.

It is believed that acid-pasteurisation is effective because the pH destroys or prevents from multiplying many of the microorganisms which could spoil the product. Any microorganisms which are resistant to the acid pH are destroyed or inactivated by the relatively mild heat sterilization.

It has been proposed that pasta products, such as noodles, could be made shelf-stable by treatment with acids. For instance, JP-A-6 307 770 describes the preparation of a noodle which contains an acid preservative. The preservative comprises a mixture of: a conventional food-acceptable organic acid; a salt of such an acid; and a water-soluble macromolecular polysaccharide or chitosan. The organic acid, used as such or as its salt, may be citric, tartaric, malic, fumaric, lactic, acetic or gluconic acid. The polysaccharide may be alginic acid or sodium alginate. It is reported that noodles treated with this preservative mixture were stable for up to ten days. However, ten days is not a commercially acceptable time, especially if the product has to be transported to and stored at its point of sale and then stored at its point of use. Thus, such a product would be unsuitable for use in supermarkets.

It has also been proposed that pasta products could be made shelf-stable by carrying out acid-pasteurisation. For instance, US-A-2 434 388 refers to the preparation of shelf-stable macaroni by lightly pickling the macaroni with acetic acid and then pasteurising the product while contained in a can.

U.S. Pat. No. 3 886 296 describes a process for producing acid-pasteurised canned spaghetti and other pasta products. The pasta product is blanched in an acid solution to reduce its pH. Thereafter the blanched product is immersed in an acidic liquid medium. The containers are sealed and subjected to a short-hold heat treatment to render the product sterile. Suitable acids for use in the process are acetic, citric, hydrochloric, lactic, malic, phosphoric and tartaric acids. The preferred acid is malic acid.

U.S. Pat. No. 4 540 590 discloses a process for producing a rapid cooking pasta product. In the process, the pasta dough is formed from constituents which can include an acidulant.

The dough is formed into shaped products using a particular extrusion process. The shaped products are dried, packaged and heat sterilized at 70° to 95° C. Malic and lactic acids are mentioned as useful acidulants.

U.S. Pat. Nos. 4 552 772 and 4 599 238 disclose the use of a combination of citric and/or lactic acid with table salt in one solution to enhance the preservability of boiled noodle products. Such products can be commercially distributed at ambient temperature. The boiled noodles are treated with the acid solution, packaged and heat sterilized.

U.S. Pat. No. 4 597 976 relates to the production of pasta-based ready meals. The ready meals generally have three components, being the pasta, a meat component and a sauce. The pasta, the meat component and, if necessary, the sauce are acidified to a pH of less than 4.6 and are hot filled into containers. The sealed containers are then pasteurised. Acids such as citric, fumaric, lactic, malic, tartaric, sulphuric, hydrochloric and phosphoric acids can be used to acidify the components.

U.S. Pat. No. 4 734 291 relates to the production of an "al dente" pasta product having storage stability. The product is produced by cooking freshly extruded pasta with steam or boiling water. The cooked pasta is sealed in a container with sufficient water to complete hydration of the pasta. The water contains sufficient acid to reduce the pH to less than 4.6. The sealed container is then sterilised. Fumaric acid is specifically referred to for use as the acidulant.

U.S. Pat. No. 4 828 852 relates to a process for producing a precooked pasta product by boiling the raw pasta in acidified water to partially cook the pasta. The partially cooked pasta is soaked in acidified water and then coated with an acidified cream. The coated product is packaged and heat processed to complete the cooking. Acids which can be used include acetic, malic, fumaric, tartaric, phosphoric, adipic, lactic and citric acids.

An early proposal for the acid-pasteurisation of rice is set forth in U.S. Pat. No. 1 589 672. The disclosed process comprises blanching or boiling rice in acidulated water, immersing the blanched rice in saline and canning the rice under vacuum. The wate is acidulated with phosphoric acid.

U.S. Pat. No. 2 187 718 discloses a process for producing a canned rice product which comprises cooking the rice in an acid solution, canning the cooked product and sterilizing the canned product. The acid is supplied as a fruit juice which contains malic, citric, tartaric, lactic or acetic acid.

U.S. Pat. No. 2 616 810 discloses a process for producing canned rice which comprises cooking the rice in a saline solution, draining, acidulating the rice, canning the rice and sterilizing the canned rice. Particularly mentioned acids are lactic and tartaric acids.

U.S. Pat. No. 3 647 486 discloses a process in which raw rice is cooked in acidified water at a temperature above the gelatinisation point of starch but below the boiling point of water to achieve a water content of 58 to 65%. The cooked rice is then canned and the cans are sealed and sterilized. The cans are then cooled and the product is aged for a number of days before use. The acids which can be used include acetic, fumaric, malic, tartaric, ascorbic, isoascorbic, succinic, citric and adipic acids.

EP-A-0 322 996 discloses a process for producing a two pack ready meal based on rice. In the first pack is an acid-pasteurized starchy foodstuff, such as rice or pasta, having a pH of below 4.6. In the second pack is an alkalinating agent. Acids used to acidify the rice and pasta include hydrochloric, malic and citric acids. In use, the alkalinating agent is used to neutralise the acid flavour of the rice or pasta product.

It can thus be seen that there have been many proposals for the acid-pasteurisation of rice. It can be seen from the prior art cited above that, in all cases, the acidification has been carried out using recognised food acids. These are generally low molecular weight inorganic or, preferably, organic acids. Such recognised food acids are listed, for example, in the CRC Handbook of Food Additives, edited by Thomas E. Furia, 2nd Edition, Volume 1, 1977, pages 225-270.

The present Applicants have found that, although prior art acid-pasteurised rice products may be acceptable from the point of view of shelf-stability, they have serious drawbacks. The main one is that the acids used to enhance the shelf-stability of the product also endow the product with an acid taste. This is not surprising as the whole point of adding the acid is to reduce the pH of the product. It would therefore seem to be inevitable that a shelf-stable acid-pasteurised rice product will have an acid taste. However, from the consumer's point of view, the acid taste is undesirable.

The acid flavour may be masked either by use of an alkalinating agent, as disclosed in EP-A-0 322 996, or by use of strong seasonings. However, the use of an alkalinating agent adds to the expense of the produce and also complicates the preparation of the product. The use of strong seasonings limits the range of products which can be produced.

A further drawback with acid-pasteurisation is that it may adversely affect the other organoleptic properties of the rice. A premium rice product, as prepared for eating, should have certain organoleptic qualities, which are generally classified in the areas of taste, smell, appearance and texture. Premium rice should have the characteristic taste of rice. Some treatments of rice can introduce non-rice flavours, such as metalllic or chlorine-derived tastes. Others can remove flavour from rice so that it is bland.

Premium rice should have the characteristic smell of rice. This can be destroyed by some treatments or masked by non-rice odours introduced by other treatments. For instance, treatments with sulphur dioxide-containing agents can introduce the characteristic smell of sulphur dioxide.

Premium rice should in appearance be white or nearly white and should appear to have grains of approximately the same size. There should preferably be no broken grains or peck. Some treatments introduce yellow or brown colours or cause the rice grains to break up.

The texture of premium rice should be firm, but not hard, rubbery or soft, and should be non-sticky. The rice should have a moist, but not wet or dry, mouthfeel, should not be oily or slimy and should have grains which generally do not adhere to one another. If the rice grains do adhere to one another, the rice product will have an unacceptable sticky mouthfeel. Some treatments have adverse effects on the texture of rice and in particular prolonged treatments at elevated temperatures can lead to the production of soft, sticky and wet rice product.

SUMMARY OF THE INVENTION

It is therefore an object of the present invention to provide premium quality, shelf-stable rice.

It is a further object of the invention to provide a process for producing such premium quality, shelf-stable rice.

DESCRIPTION OF CERTAIN PREFERRED EMBODIMENT(S)

Therefore, according to the present invention, there is provided shelf-stable, acid-pasteurised rice wherein the acidifying agent is a polymeric food acceptable acid.

Preferably, the rice is contained in a microorganism-impermeable container.

The rice may be "pre-cooked", by which is meant that the rice can be prepared for consumption merely by heating it, for instance in a conventional oven or a microwave oven or by steaming it or immersing it in hot or boiling water, to the required temperature. The rice or pasta will not need any prolonged heat treatment in order to cook it. It can be prepared for eating by heating for a period between 30 seconds and three minutes. It can thus be seen that the rice of the present invention in this form can be used as a convenience food.

Alternatively, the rice may be "partially cooked" by which is meant that the rice cannot be prepared for eating merely by heating it to the required temperature. It will also need to be held at the required temperature for a period of time. Generally, this period of time will be relatively short, of the order of two or three minutes, so that the product can be used as a convenience food.

Preferably, the polymeric acid has a cellulosic or saccharide-derived backbone having pendant carboxyl groups. Particularly preferred polymeric acids are alginic acid, carageenic acid, pectic acid and carboxymethyl cellulose (CMC) acid. Presently, the most preferred polymeric acid is alginic acid.

The pH of the rice should be below 4.5, which is generally recognised as being the maximum pH which ensures that the pasteurized product remains stable. Preferably, the pH of the rice is below 4.2 and most preferably the pH is in the range 3.7 to 3.9. The pH of the rice is determined by macerating 50 g of rice in 150 ml of deionised water and measuring the pH of the supernatant.

The pH may be below 3.5. However, the lower the pH, the more acid must be used and the more likely it is that acid flavour notes will be introduced into the rice. As a practical matter, the skilled person, given the teaching in the present application, will be able to balance the pH level and amount of acid used to ensure that the rice is fully shelf-stable but does not have any acid flavour notes.

Preferably, the rice comprises from 0.01 to 1% by weight of the polymeric acid, where the polymeric acid is used alone. Advantageously, the polymeric acid content of the product is from 0.2 to 0.8% by weight.

It has been found, surprisingly, that the use of a polymeric food acceptable acid enables rice to be acid-pasteurised without introducing acid flavour notes into the product. Moreover, the rice of the present invention has organoleptic properties, such as taste, smell, appearance and texture, which make it a premium rice product. It is unexpected, in view of the fact that previously proposed acid-pasteurisation procedures have all resulted in products having an acid taste and lower quality, that the rice of the present invention has this combination of no acid taste and premium organoleptic properties.

The rice of the present invention is also advantageous in that, unlike other commercially available rice products, it is easily prepared and stored and has a substantial shelf-life. It thus lends itself to distribution, display and sale in a wide range of commercial settings, for instance both in supermarkets and convenience stores. These advantages accrue without the necessity to sacrifice the organoleptic properties.

The rice of the present invention is also advantageous in that it eliminates the need for specialised delivery and storage means. Unlike frozen rice, the rice of the present invention can be stored at ambient temperatures for long periods without the product deteriorating in quality. The substantial economies resulting from obviating the need for refrigeration make the product appealing from a cost standpoint.

It is to be noted that polymeric food acceptable acids have never before been proposed as acidulants. The polymeric acids or, more usually, their sodium or calcium salts have found extensive use in the food industry, but not as acidulants. Generally, the polymeric acids and their sodium or calcium salts are used as thickening agents or coatings in food products. CMC in particular is extensively used as a thickener. Alginates are used: as stabilizers in ice cream, water ices, sherbets and cheese; as gelling agents in water dessert gels and milk puddings; as suspending and thickening agents in fruit drinks and beverages; as foam stabilizers in beer; as emulsifiers in salad dressings and as film forming agents in coatings for meat and fish. Thus, the prior art provides no suggestion that such polymeric acids could be used as acidulants, let alone in acid-pasteurisation with the surprising results shown in the present application. In this respect, reference is made to the Chapter on Gums at pages 295 to 360 in the CRC Handbook of Food Additives cited above.

A further property of these polymeric acids is that they are generally only sparingly soluble in water. It is therefore surprising that they can in fact act as acidulants. It is unexpected that they can produce the required acidification without necessitating the use of large quantities of the acid.

The shelf-stable, acid-pasteurised rice of the present invention may be fully hydrated such that it can be prepared for consumption merely by reheating, for instance in an oven, such as a microwave oven. Alternatively, the rice may be slightly less than fully hydrated so that it may be prepared for consumption by reheating in boiling water or by steaming. This reheating will also allow the rice to become fully hydrated and ready for serving.

The water content of the final product if fully hydrated will generally be in the region of 60 to 70%, depending on the variety of rice used as the starting material. For rice which needs to be partially hydrated during cooking, the water content will be generally in the region of 50 to 55%. At these water contents, normal rice would be susceptible to microbial spoilage, whereas the rice of the present invention is not.

Preferably, the rice of the present invention is not accompanied by free liquid water. This may be achieved by draining the product after cooking and before pasteurisation or by carrying out the cooking and pasteurisation in an amount of water such that all the water is absorbed by the product during processing.

The rice of the present invention, advantageously in the absence of free water, may be contained in a microorganism-impermeable container so as to preserve its shelf-stability. Advantageously, the container is gas-impermeable to prevent the ingress of oxygen which can, in some circumstances, cause browning of the rice. Such containers include cans, jars, bottles, foil trays and pouches. The rice will generally be sealed in the container prior to pasteurisation.

Preferably, the rice of the present invention is contained in a pouch made of plastic material. The plastic material may be a single layer of material or may, preferably, be a laminated material comprising a reinforcing layer, such as a nylon or polyester layer, and a sealing layer, such as a polyethylene, and a barrier layer such as polyvinylidene chloride or ethylene-vinyl alcohol copolymer layer. Such plastic materials are well known in the art. The advantage of packaging the rice of the invention in plastics materials is that the product can be reheated in a microwave oven without the need to decant it before reheating.

The rice of the present invention is preferably packed under vacuum or an inert gas atmosphere in order to avoid any discolouration of the product by oxidation during pasteurisation. Packing under an inert gas atmosphere is preferred as this will tend to prevent any flavour changes during processing and storage of the product. The inert gas may be nitrogen.

If desired, the rice of the present invention may be coated with a small quantity of an edible oil, such as sunflower oil, ground nut oil, soya oil or a mixture thereof. The edible oil may be used to alter the mouthfeel of the product and to ensure that it does not stick together or clump during prolonged storage. Preferably, the edible oil comprises from 0.3 to 1% by weight of the product.

The rice of the present invention may, if desired, contain one or more conventional acidulants in order to potentiate the action of the polymeric acid. The amount of conventional acidulant used should not be so great as to introduce acid flavour notes to the product. Even if a potentiating acidulant is used, it is still the polymeric acid which enables the product to be acid-pasteurised without the introduction of acid flavour notes.

The potentiating acidulants will be used to assist in controlling the pH of the rice of the present invention at the desired level but will not generally be present in sufficient quantity to bring the pH to the desired level themselves. In particular, it should be ensured that the amount of potentiating acidulant used is not so large as to impart acid flavour notes to the rice.

Suitable potentiating acidulants include inorganic acids, such as hydrochloric, sulphuric and phosphoric acids, and organic acids, such as malic, lactic, citric, tartaric, adipic, fumaric, acetic, ascorbic, isoascorbic and succinic acids.

If a potentiating acidulant is used, it will be possible to reduce the amount of polymeric food acceptable acid which is used. However, the amount used should not be such that the addition of the potentiating acidulant leads to the introduction of acid flavour notes into the product.

The rice according to the present invention may be derived from raw brown or white rice or from parboiled brown or white rice. The invention is applicable to short, medium or long grain rice. However, preferably, long grain rice is used. Any variety of rice may be used. It will be appreciated by those skilled in the art that different varieties of rice will require different treatment regimes. However, determining the appropriate regime will be a matter of routine experiment for the skilled person, given the teaching of the present application.

Preferably, the rice is long grain, parboiled rice produced by conventional "wet" processing or produced by the "dry" process described in EP-A-0 352 939.

According to a second aspect of the present invention, there is provided a process which comprises:
(a) treating rice with an aqueous solution adjusted to a pH of 4.5 or below by use of a polymeric, food acceptable acid; and
(b) pasteurising the rice while it is maintained at said pH of 4.5 or below by use of a polymeric food acceptable acid whereby shelf-stable, acid-pasteurised rice is produced.

Preferably, the process includes a further step of:
(c) either before or after step (a) or after step (b), sealing the rice in a microorganism-impermeable container.

It must be borne in mind that some cooking of the rice will take place during the pasteurisation step (b). In order to obtain a desired degree of cooking, it will be necessary to control the other steps in the process in dependence on the conditions used in the pasteurisation step (b).

In a first alternative, the treatment step (a) is carried out for such a time and at such a temperature that the rice becomes at least partially cooked and becomes cooked to the desired degree in the acid-pasteurisation step (b).

In a second alternative, the pasteurising step (b) is carried out for such a time and at such a temperature that the rice becomes not only pasteurised but also cooked to the desired degree.

In a third alternative, the process includes a step (d) in which the rice is partially cooked. This partial cooking step (d) may be carried out before or after step (a). If the partial cooking step (d) is carried out after step (a), it must be ensured that, after the partial cooking step (d), the pH of the rice is retained below 4.5 by use of a polymeric food acceptable acid.

In a fourth alternative, the process includes the step (d) and the treatment step (a) is carried out under conditions which cause further partial cooking of the rice. This alternative is similar to the third alternative, except that the partial cooking step (d), the treatment step (a) and the pasteurising step (b) together will provide the necessary required degree of cooking of the rice.

If desired, the rice may be washed in between any of the process stages set forth above. It must be ensured that any such washes do not allow the pH of the rice to rise above 4.5. Thus, it is preferred that the rice be washed in an aqueous solution whose pH has been adjusted to 4.5 or less using a polymeric, food acceptable acid.

Preferably, the process conditions are adjusted such that the final rice product is not accompanied by any free liquid water. This may be achieved by using in the process only as much water as is required to hydrate the rice to the desired degree. Alternatively, the rice may be drained of all free water, preferably just prior to sealing in a container. In this alternative, it will be necessary to ensure that the rice is hydrated to the desired degree before it is drained.

It is preferred that sealing step (c) is carried out before the pasteurising step (b). Most preferably, the sealing step (c) is carried out immediately prior to the pasteurising step (c).

If the sealing step (c) is carried out after the pasteurising step (b), it will be necessary to carry out the pasteurising and sealing steps under aseptic conditions. This can be disadvantageous as it requires special arrangements to be made for the aseptic steps. This can add to the cost of the process. However, if an aseptic area is already available, packaging and sealing after pasteurisation may enable bulk treatments to be carried out upstream of the pasteurisation step (b), thus allowing cost savings to be made.

Preferably, during the processing of the rice, an edible oil, such as one of the edible oils referred to above, is added so that the rice is coated with the edible oil. Preferably, the edible oil comprises from 0.3 to 1% by weight of the product.

The polymeric food-acceptable acid may be provided as such. Alternatively, it may be generated in situ by reaction between a salt or other derivative of the polymeric acid and an inorganic or organic acid. For instance, alginic acid may be generated by reacting sodium alginate with hydrochloric acid. This will be particularly advantageous in that the other product of the reaction will be sodium chloride (common salt) which is generally added to water in which rice is boiled.

Optionally, the polymeric food acceptable acid may be used with a potentiating acid as referred to above. The potentiating acid will be used to assist in controlling the pH of the aqueous solution but will not by itself provide the necessary acidity to reduce the pH to the desired level.

Preferred components and amounts of the components to be used in the process of the present invention are as set forth above in relation to the first aspect of the invention.

It will be appreciated by the skilled person that the conditions used in the process of the present invention will vary depending on the starting material. For instance, it takes longer to cook parboiled white rice than it does to cook raw white rice.

It is, however, essential to ensure that a proper pasteurisation step is carried out. The conditions by which this can be carried out are well known to those of skill in the art. It is generally accepted that the minimum requirements for a pasteurisation step are that the centre temperature of the food should be held at 93° C. for five minutes and that the food should have a pH of 4.5. It will be appreciated that if higher temperatures or lower pHs are used, the treatment time may be reduced. However, it is preferred that the rice has a pH of 3.7 to 3.9 and that a minimum centre temperature of 93° C. is held for at least 5 minutes.

Preferably, the pasteurisation step (b) and, if employed, the cooking step (d) is carried out at a temperature below 100° C. If this is done, then it is not necessary to use pressurised heating systems. The pasteurisation system can in this case be carried out under atmospheric pressure using hot water or steam to heat the product.

If desired, the pasteurisation step (b) may be carried out at a temperature above 100° C. However, this will require the use of a pressurised system to prevent water from being driven off from the rice and causing pressure to build up in the package.

If desired, the process may further include a step (e) of quenching the product after the pasteurisation step (b). The quenching may be accomplished using a solution containing a polymeric food-acceptable acid, optionally in combination with a conventional acidulant. Alternatively quenching may be achieved by spraying or immersing sealed packages in cold water.

Guidance as to suitable conditions to be used can be obtained from a study of the examples set forth below. Given the above disclosure and the examples, the skilled man will be able to determine appropriate conditions for processing any desired rice starting material.

The present invention is further described and illustrated below in the following examples. It will be appreciated that these examples are provided solely for the purposes of illustrating the invention and not for the purpose of limitation. It will further be appreciated that variations and modifications to the product and process may be made by the skilled person without departing from the spirit or scope of the invention as defined in the appended claims.

EXAMPLE 1

Long grain parboiled white rice made according to the process disclosed in EP-A-0 352 939 was used as the starting material in this example. A stock solution containing 0.12% alginic acid (Protacid F120 supplied by Protan), 0.02% hydrochloric acid and 0.74% salt was made by adding 1.24 g/l of the alginic acid, 0.62 ml/l of 34% hydrochloric acid solution and 7.4 g/l of salt to water and making up to volume. The pH of the stock solution was 3.0.

Half of the stock solution was heated to 95° C. with stirring to ensure that the alginic acid dispersed. 70 g of the rice per litre of stock solution was added to the heated stock solution and the mixture was maintained at 95° C. for 17 minutes. The rice was then drained from the solution and allowed to stand for 5 minutes. The partially cooked rice was then washed in the remaining stock solution for 1 minute and then drained. The pH of a macerate of the washed and drained rice was 3.8.

Sunflower oil was then added to the drained rice to a level of 1% by weight of the drained rice and was distributed thoroughly over the drained rice. Aliquots of the oil coated rice equivalent to 100 g of dry rice were then placed in plastics pouches. The pouches were made from a laminate of nylon, polyvinylidene chloride-coated nylon and polyethylene, which is heat sealable, strong and gas impermeable. The pouches were flushed with nitrogen and sealed. The sealed pouches were then immersed in boiling water for 30 minutes in order to achieve a centre temperature of 95° C. for 5 minutes. The pouches were removed from the boiling water and allowed to cool.

Some pouches were opened soon after cooling. The rice in the pouches was found to be free-flowing, of good colour and consisting of individual mainly unbroken grains.

The rice was reheated by immersion in boiling water for five minutes or by microwave heating in a 650 W microwave oven at full power for one minute. The reheated rice was tested by a panel of experienced tasters. It was shown to have the same mouthfeel and flavour as the starting rice which had been cooked in conventional manner. In particular, none of the tasters could detect any acid flavour notes in the rice of the present invention. The rice had a good texture, was not sticky and felt moist in the mouth. Thus, the product was of premium quality.

Further pouches were kept at room temperature for up to 3 months. The rice in the pouches showed no signs of microbial spoilage or discolouration. On opening such packages and reheating as described above, no change in the properties of the reheated rice was detectable.

EXAMPLE 2

Long grain parboiled white rice made by the conventional "wet" process and sold under the trade name "Uncle Ben's" was used as the starting material in this example.

A stock solution containing 0.1% alginic acid (Protacid F120) and having a pH of 3.9 was made up. Half of the stock solution was heated to 95° C. with stirring to ensure that the alginic acid dispersed. Then 70 g of the rice per litre of stock solution was added and the mixture was retained at 95° C. for 16 minutes. The rice was drained, allowed to stand for 5 minutes, washed for 1 minute in the other half of the stock solution, drained, coated with 1% sunflower oil and filled into pouches as described in Example 1. The pouches were then retorted for 5 minutes at 110° C. under an overpressure of 15 psi in order to effect pasteurisation.

The product was shown to be shelf-stable for at least 6 months. When reheated by boiling in water for 5 minutes or in a 650 W microwave oven for 1 minute, the product could not be distinguished from the same rice prepared by conventional cooking and was thus of premium quality. In particular, no acid notes could be detected.

EXAMPLE 3

Long grain raw white American rice was used as the starting material in this example. A stock solution containing 0.06% malic acid and 0.025% alginic acid was made up. The pH of this solution was 3.0.

400 g of the rice was placed in 5kg of stock solution, boiled at ca. 100° C. for 15 minutes and drained. While the rice was still at a temperature of above 90° C., it was transferred aseptically into pouches. The pouches were flushed with nitrogen and sealed.

After storage for 3 months at ambient temperature, the rice was reheated in a 650 W microwave oven for two minutes. The resulting rice was perfectly cooked and organoleptically acceptable with no detectable acid flavour notes and was thus of premium quality.

EXAMPLE 4

This example illustrates the use of a combined acid treatment, cooking and pasteurisation process.

The parboiled rice referred to in Example 2 was used in this example. A stock solution containing 2.7 g/l of alginic acid, 10 g/l of salt, 20 g/l of sugar and 5 g/l of oil and emulsifier was made up.

54 g of the rice and 100 g of the stock solution were filled into a pouch which was flushed with nitrogen and sealed. The pouches were of the type described in Example 1. The sealed pouch was heated by steam at atmospheric pressure for 30 minutes and then allowed to cool in cold water.

After storage for 3 months at ambient temperature, the rice was reheated in a 650 W microwave oven for two minutes. The resulting rice was perfectly cooked and organoleptically equivalent to fresh boiled rice. In particular, no acid flavour notes were detectable.

EXAMPLE 5

Example 2 was repeated except that the stock solution was made up by adding 1 g/l of sodium alginate and 2.5 ml of 34% aqueous hydrochloric acid solution to water to form alginic acid in situ. There was no difference in the quality or shelf-stability of the final product.

EXAMPLE 6

Example 1 was repeated, except that the stock solution contained 0.05% of pectic acid in place of the alginic acid. There was no difference in the quality or shelf-stability of the final product. The only noticeable difference was that the rice was slightly yellower due to the yellow colour of the pectic acid.

EXAMPLE 7

10 g of sodium polygalacturonate (sodium pectate) was dispersed in 340 ml of demineralised water. 17 g of the dispersion was diluted to 1 l with demineralised water. To the diluted dispersion was added 1 ml of 36% HCl solution. The dispersion was agitated. The final solution had a pH of 1.9 and contained 0.05% pectic acid. The final solution was used for the cooking and rinsing steps referred to below.

100 g of Suy rice was added to an excess of the final solution which had previously been brought to the boil. The rice was cooked for 17 minutes, removed from the solution and allowed to drain for 1 minute. The drained rice was immersed for 45 seconds in an excess of cold final solution, removed from the solution and allowed to drain for 5 minutes. The pH of the cooked and rinsed rice was found to be 3.6.

The rice was filled into a pouch which was flushed with nitrogen and sealed. The sealed pouch was heated in boiling water such that the centre temperature of the rice was at 95° C. for 5 minutes.

The rice thus produced had good shelf-stability and organoleptic properties. In particular, its flavour on cooking was excellent.

EXAMPLE 8

Example 3 was repeated except that the stock solution contained 0.06% alginic acid and 0.025% tartaric acid. There was no difference in the quality or shelf-stability of the final product.

EXAMPLE 9

Long grain raw white American rice was used as the starting material in this example. A stock solution containing 0.1% carageenic acid having a pH of 3.8 was made up.

400 g of the rice was placed in 5 kg of water containing 10 g/l of salt and 20 g/l of sugar. The mixture was boiled for 10 minutes at ca. 100° C. to partially pre-cook the rice. The cooked rice was drained and washed in cold water. The cooked rice was then soaked in 5 kg of stock solution. The soaked rice was drained and placed in a glass jar. The jar was flushed with nitrogen and sealed. The sealed glass jar was retorted under 15 psi over pressure at 110° C. for five minutes to effect pasteurisation.

The product was shelf-stable and, on reheating, had good organoleptic properties. It had no acid flavour notes.

EXAMPLE 10

Example 4 was repeated except that the stock solution contained 2.5 g/l of CMC acid, 10 g/l of salt, 20 g/l of sugar and 5 g/l rape seed oil. The product was shelf-stable and, on reheating had good organoleptic properties. It had no acid flavour notes.

EXAMPLE 11

Example 8 was repeated except that the stock solution contained 0.08% alginic acid and 0.02 citric acid and had a pH of 3.3 and that the cooked and acid-treated rice was placed in an aluminium foil tray which was sealed by crimping. The product was shelf-stable and had good organoleptic properties. It had no acid flavour notes.

EXAMPLE 12

The parboiled rice referred to in Example 1 was used in this example. A stock solution containing 0.8 g/l alginic acid was adjusted to a pH of 3.5 using phosphoric acid.

400 g of the rice was placed in 5 kg of the stock solution and heated at 95° C. for 15 minutes. The rice was drained and washed for 2 minutes in a further 5 kg of stock solution. The washed rice was drained and coated to a level of 1% by weight with sunflower oil. The cooked rice was filled into cans which were flushed with nitrogen and sealed. The sealed cans were heated in boiling water at atmospheric pressure for ten minutes.

The product was shelf-stable and had good organoleptic properties. No acid flavour notes were detectable.

We claim:

1. A process which comprises:
   (a) treating rice with an aqueous solution of a polymeric food acceptable acid to adjust the pH of the rice to 4.5 or below; and
   (b) heat pasteurizing the rice while it is maintained at said pH of 4.5 or below by use of a polymeric food acceptable acid, whereby shelf-stable, acid-pasteurized rice is produced.

2. The process of claim 1 wherein the treatment step (a) is carried out for such a time at such a temperature as to partially cook the rice, cooking to the desired degree being completed during the pasteurization step (b).

3. The process of claim 1, wherein the pasteurization step (b) is carried out for such a time and at such a temperature that the rice becomes not only pasteurized but also cooked to the desired degree.

4. The process of claim 1, including a further step of
   (c) either before or after step (a) or after step (b), sealing the rice in a microorganism-impermeable container.

5. The process of claim 4, wherein the rice is hydrated to a desired degree prior to sealing in the container and there is used only as much water as is required to hydrate the rice to the desired degree.

6. The process of claim 1, including a further step of
   (d) partially cooking the rice before carrying out step (a).

7. The process of claim 6, wherein the partial cooking step (d) is carried out under conditions which retain the pH of the rice below 4.5 by use of a polymeric food acceptable acid.

8. The process of claim 6, wherein the partial cooking step (d) is carried out before step (a).

9. The process of claim 8, wherein the rice is partially cooked in both steps (a) and (d).

10. The process of claim 6, wherein the rice is washed after any one of steps (a), (b) or (d).

11. The process of claim 1, including the further step of
    (e) quenching the rice after the acid-pasteurization step (b).

12. The process of claim 1, wherein, after pasteurizing, the rice produced by the process is drained of all free water.

13. The process of claim 1, wherein the polymeric acid is generated in situ by reaction between a salt of the polymeric acid and an inorganic or organic acid as the rice is being treated in step (a).

* * * * *